United States Patent [19]

Heytmeijer

[11] Patent Number: 4,792,342

[45] Date of Patent: Dec. 20, 1988

[54] POWDER DENSIFICATION USING ICE

[75] Inventor: Herman R. Heytmeijer, Whippany, N.J.

[73] Assignee: North American Philips Corporation, New York, N.Y.

[21] Appl. No.: 96,994

[22] Filed: Sep. 16, 1987

[51] Int. Cl.⁴ .............................................. C22B 01/14
[52] U.S. Cl. ..................................... 23/313 R; 75/25
[58] Field of Search ...................... 23/313 R; 75/3, 25

[56] References Cited

U.S. PATENT DOCUMENTS 859,411  7/1907  Schumacher ............................... 75/3
3,275,449  9/1966  Fritzberg ................................. 23/313

Primary Examiner—Ferris H. Lander
Assistant Examiner—Anthony J. Green
Attorney, Agent, or Firm—John C. Fox

[57] ABSTRACT

Toxic furnace dust having a low bulk density is densified into pellets by mixing the dust with ice, preferably by tumbling in a rotating drum. A six to eight-fold increase in bulk density may be realized, greatly facilitating the disposal of the toxic waste.

6 Claims, No Drawings

POWDER DENSIFICATION USING ICE

BACKGROUND OF THE INVENTION

This invention relates to a method for densifying powders, and more particularly relates to the densification of powders by mixing them with ice.

Finely divided powders having low bulk densities can present difficult handling problems. For example, operating on such powders in an open room, for example, mixing two powders or transferring a powder from one container to another, can cause losses as well as environmental hazards-in the form of airborne dust.

It is known that handling losses of such powders can be reduced by increasing their bulk densities, for example, by agglomeration. However, where such powders are an unwanted by-product of an industrial operation (herein referred to as "dust") sophisticated agglomerating or pelletizing techniques such as spray drying and disk or pan pelletizing are not appropriate.

In conventional disk or pan pelletizing, both dry powder and liquid are introduced onto a rotating disk or into a pan. In order to effect the desired balling up and densification of the powder, the liquid is conventionally sprayed onto the cascading powder. However, such procedures require the use of expensive equipment and pose difficult material handling problems where toxicity of the dust is a factor. This is because the pelletizing operations are generally carried out in an open environment.

A particularly troublesome disposal problem is presented by toxic furnace dust, such as is generated during the high temperature firing of luminescent materials, often referred to as "phosphors". Such firing promotes the formation of the phosphor composition from a "raw mix" of starting powder materials by solid state diffusion reactions, as well as a multiplicity of intermediate reactions, some of which involve the transport of vapors. Some of these vapors are both volatile and toxic, and are lost from the mix during firing.

For example, the raw mix for calcium halophosphate, a fluorescent lamp phosphor, includes calcium hydrogen orthophosphate, calcium carbonate and calcium fluoride as primary components, as well as ammonium chloride, antimony trioxide, manganous carbonate and cadmium oxide as secondary components.

At temperatures above 500° C., a considerable loss of chlorine and antimony is observed. For this reason, excess halogen is used in the raw mix formulation. The most likely reason for the chlorine and antimony losses is that the hydrogen chloride formed during the dissociation of the ammonium chloride does not react completely with the calcium carbonate, allowing part of it to react with the antimony trioxide, forming antimony trichloride. Antimony trichloride is the most volatile compound that can be formed from the ingredients in the raw mix. It has a melting point of 73.4° C., a boiling point of 220.2° C., and has a considerable vapor pressure, i.e., 3.6 millimeters of mercury at 80° C., and 260 millimeters of mercury at 190° C.

Also taking place at high temperatures are the diffusion reactions that drive the manganese, cadmium and antimony into the crystal lattice of the fluorochlorapatite, to produce the phosphor. The raw mix contains precursors of the above materials in amounts larger than are stoichiometrically required. The excess is vaporized and swept out of the furnace by a small flow of nitrogen gas which continuously passes through the furnace primarily to maintain a slightly reducing atmosphere.

The volatiles that are vented from the furnace are carried away by "sweep air" and ducted to dust collectors. During their passage from furnace to collector, they solidify through condensation and can therefore be removed from the air stream by filtration. Such furnace dust is characteristically light and voluminous, and thus has a very low bulk density. The major components of this furnace dust are cadmium and antimony. Thus, it must be considered a toxic waste which can only be disposed of in an approved manner. Typically, disposal companies charge a fixed fee per container for removal of this toxic waste. Densification of the waste in a simple and straight forward manner could thus represent a significant savings in disposal costs to the manufacturer of the phosphor.

Because the disposal costs are based on a per drum rather than on a weight basis, efforts have been made in the past to pack more dust into each drum. These efforts have taken the form of adding a few inches (about 6 to 8 gallons in a standard drum 42 centimeters in diameter by 69 centimeters high) of water to the drum before placing it under the dust collector. Since the idea is to wet, collapse and densify the dust, a small amount of wetting agent is added to the water.

When the drum has been filled, it is set aside to allow the dust to settle. Then the dust from another drum is added to the extent that settling has taken place.

The above approach is only marginally successful because only the dust in the bottom of the drum becomes wetted down. In addition, the water may soften the wall of the drum or freeze if drums are stored in an unheated area and rupture the wall, eventually leaking out, and carrying toxic material with it. Furthermore, this approach requires handling toxic dust that easily becomes airborne, a health hazard for the operator even if a dust mask is being worn.

Accordingly, it is an object of the invention to provide a simple, inexpensive method of densifying dust.

It is another object of the invention to provide such a method for densifying toxic dust which involves minimum exposure of an operator to the dust.

SUMMARY OF THE INVENTION

In accordance with the invention, dust is densified by mixing it with ice. As the ice melts, it provides controlled wetting of the dust particles throughout the mixture, causing the dust particles to agglomerate into pellets, and greatly increasing the bulk density of the dust. While the ice may be added in the form of one to a few large blocks or chunks, it is preferred to be added in the form of cubes or pieces of ice, of a size sufficient to last until the dust has been substantially pelletized, usually about one to two hours. For this purpose, the pieces are preferably at least about one cm (smallest dimension) in size.

The optimum amount of ice added for proper pelletizing will vary somewhat depending upon the character and composition of the dust. To achieve maximum densification, the amount of ice added must be controlled to within about plus or minus 20% of this optimum amount. Too little ice may leave a mixture of pellets and dampened dust, while too much ice will result in the formation of a few large, wet lumps of material. In general, however, adding ice in the amount of about 5 to 40% of the weight of the dust will result in a significant increase in bulk density of the dust.

A convenient method of mixing is by tumbling, such as may be achieved in a rotating drum. The rotational speed of the drum and the duration of rolling also have an effect on pelletizing. For example, if the rpm of the drum rollers is too low, proper tumbling action is not achieved so that the pellets do not attain maximum density. If the drums are rolled too long, especially when too much ice has been added, the chances increase that the pellets will roll up into large lumps.

DESCRIPTION OF THE PREFERRED EMBODIMENT

Toxic furnace dust generated during the high temperature firing step that is used in the manufacture of halophosphate phosphor, is collected in a standard (42 centimeters in diameter by 69 centimeters high) drum. The drum is essentially filled with dust. The water needed for pelletizing is added in the proper amount in the form of ice cubes or pieces of ice. After the ice has been added to the drum and the lid is secured, the drum is placed on a drum roller and rotated for a sufficient time to allow the ice to melt. Because the water is gradually being released to the tumbling powder, pelletizing is effected. To prevent any dust from escaping from the drum during the initial phases of tumbling, a standard paper insert is placed between the rim and the lid of the drum.

Using ice in the amount of 10 percent of the weight of the dust, the optimum amount of ice for this type of dust, and rolling the drum for one and one-half hours at about 30 rpm, the resulting dust pellets are spheroidal in shape, and generally range from about one-quarter to three-quarter of an inch in size and have a bulk density of about 79.3 pounds per cubic foot as compared to about 9.9 pounds per cubic foot of the original dust.

The size non-uniformity of the pellets is advantageous since it allows more pellets to be packed into a drum. The pelletized dust from about 6 to 8 drums can be combined into a single drum using this technique. The transfer can be made essentially dust free because the pellets are damp.

What is claimed is:

1. Method for densification of powder comprising volatilized and recovered waste products from the high temperature firing of a phosphor, the method comprising adding to the powder ice in the form of pieces at least about 1 centimeter in size, and mixing the powder with ice for about 1 to 2 hours.

2. The method of claim 1 in which the amount of ice is from about 5 to 40 percent by weight of the powder.

3. The method of claim 1 in which mixing is carried out by tumbling the mixture in a rotating drum.

4. The method of claim 1 in which the amount of ice is from about 8 to 12 weight percent.

5. The method of claim 1 in which the drum is rotated at about 30 rpm.

6. The method of claim 1 in which the drum is rotated for about one and one-half hours.

* * * * *